United States Patent [19]
Saylor

[11] Patent Number: 5,308,670
[45] Date of Patent: May 3, 1994

[54] FLOOR COVER WITH RAISED SIDES

[76] Inventor: Steven S. Saylor, P.O. Box 204, Dayton, Nev. 89403-0204

[21] Appl. No.: 19,623
[22] Filed: Apr. 19, 1993
[51] Int. Cl.⁵ ............................................. F16N 31/00
[52] U.S. Cl. .................... 428/81; D12/203; 206/557
[58] Field of Search ....................... 296/97.23; 15/215; 206/557; 404/35, 36; 428/81; D12/203

[56] References Cited

U.S. PATENT DOCUMENTS

| | | | |
|---|---|---|---|
| 2,897,963 | 8/1959 | Byers, Jr. .................. | 296/97.23 X |
| 3,094,350 | 6/1963 | Cusick ....................... | 296/97.23 |
| 3,401,975 | 9/1968 | Oger ........................... | 296/97.23 |
| 4,798,754 | 1/1989 | Tomek ........................ | 428/81 X |
| 5,128,189 | 7/1992 | Bartlett ...................... | 428/81 X |

*Primary Examiner*—Henry F. Epstein
*Attorney, Agent, or Firm*—Armstrong, Westerman, Hattori, McLeland & Naughton

[57] ABSTRACT

The invention comprises a vinyl pad with raised sides. The pad is placed beneath a parked vehicle in a garage, maintenance, or storage area to catch melting snow, water, sand, salts, solvents, oils, mud and dirt falling off the vehicle and containing the material on the pad.

4 Claims, 1 Drawing Sheet

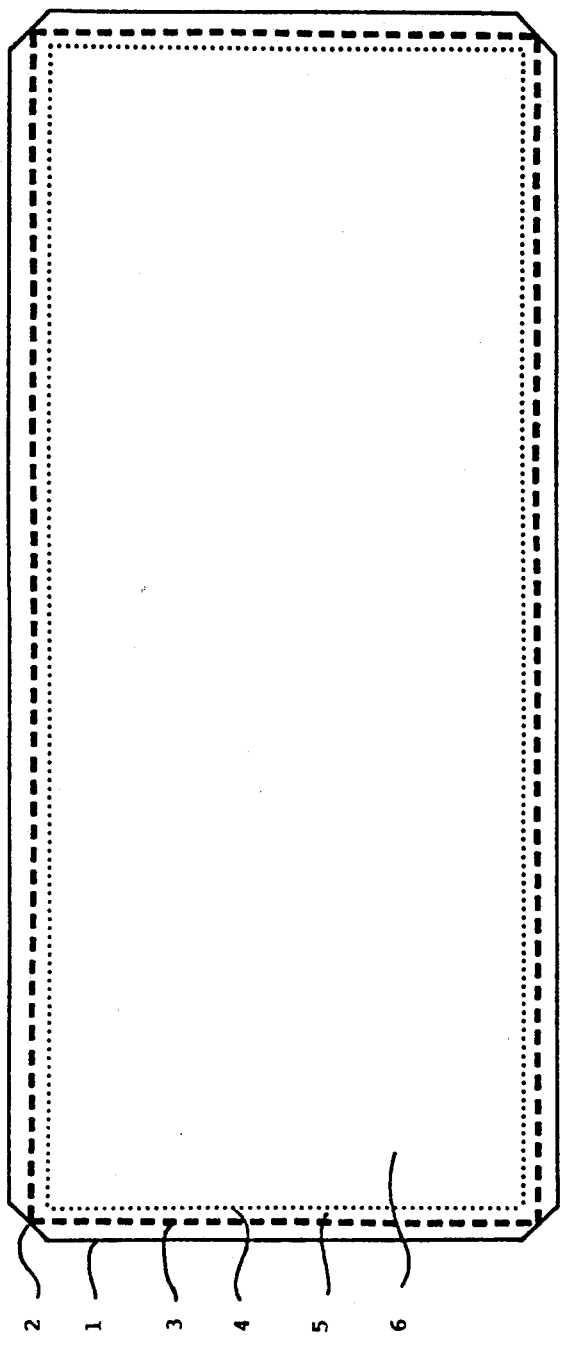
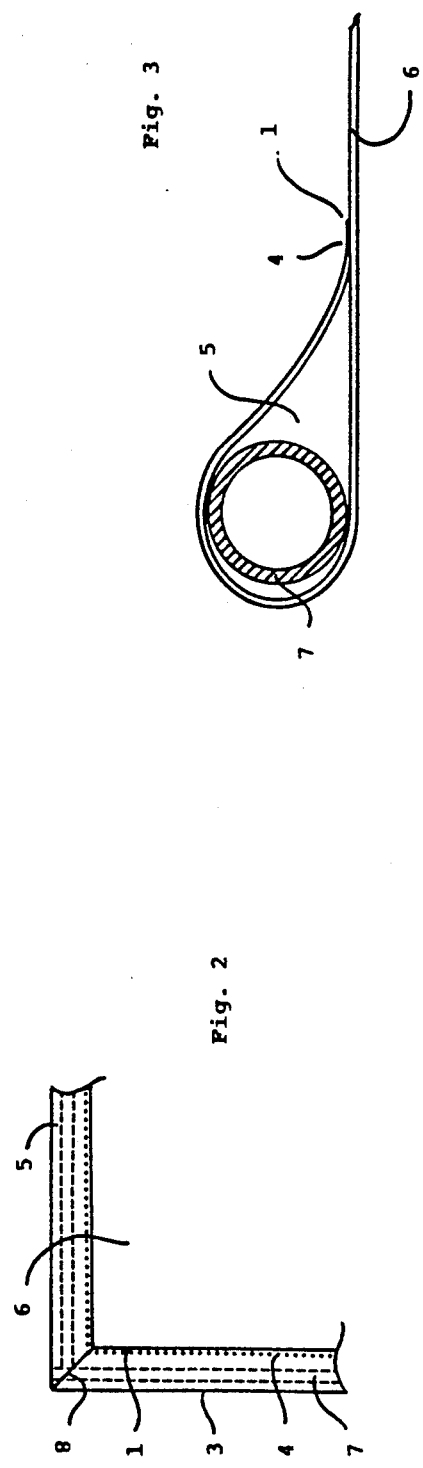

FLOOR COVER WITH RAISED SIDES

SUMMARY OF THE INVENTION

This invention relates to a pad for a garage floor, beneath a vehicle. The pad is designed to catch and contain water, snow, salt, sand, dirt, grease, oils and solvents falling off the vehicle. The pad prevents runoff of water, damage to floor and surroundings from salts, grinding sand, flooding and solvents.

BRIEF DESCRIPTION OF DRAWINGS

FIG. 1 is a top plan view of the full vinyl sheet.

FIG. 2 is a corner detail of welded vinyl sheet with hose insert in a vinyl pocket.

FIG. 3 is a cross section of the vinyl pocket with hose insert.

DESCRIPTION OF PREFERRED EMBODIMENT

FIG. 1 shows a top view of the vinyl pad, 6. The corners of the pad are trimmed at a 45 degree angle, 2. The outer edge 1 of the trimmed pad 6 is folded over, as at 3, and RF (radio frequency) butt welded, at 4. This creates a pocket 5. Pocket 5 is open on each end, as at 8 (FIG. 2). A piece of reinforced rubber hose 7 (FIGS. 2 and 3), the length of pocket 5, is inserted into the open end 8, thus raising the sides of the pad. This is done on all four sides, creating a basin to contain the elements falling off the vehicle onto the pad. The pad can be made in various sizes with varying size hose diameters.

I claim:

1. A pad for positioning underneath a vehicle for collecting and retaining fluid and solid materials falling from the vehicle, comprising a flat and generally rectangular base of vinyl material having outer edge portions folded over and affixed to the base material thereby forming a hollow pocket extending along each edge of the base, and a tubular member inserted into and extending along a length of each of the edge pockets, thereby forming raised sides and creating, with a flat portion of the pad, a basin to contain the materials falling off the vehicle.

2. A pad according to claim 1, wherein the outer edge portions of the base are folded over and welded to the base material.

3. A pad according to claim 2, wherein the tubular member is reinforced hose.

4. A pad according to claim 3, wherein corners of the base are trimmed at an angle of 45 degrees.

* * * * *